June 28, 1966　　　A. L. ELLIS　　　3,258,177
MEASURING AND DISPENSING DEVICE FOR GRANULAR MATERIAL
Filed Aug. 31, 1965　　　2 Sheets-Sheet 2
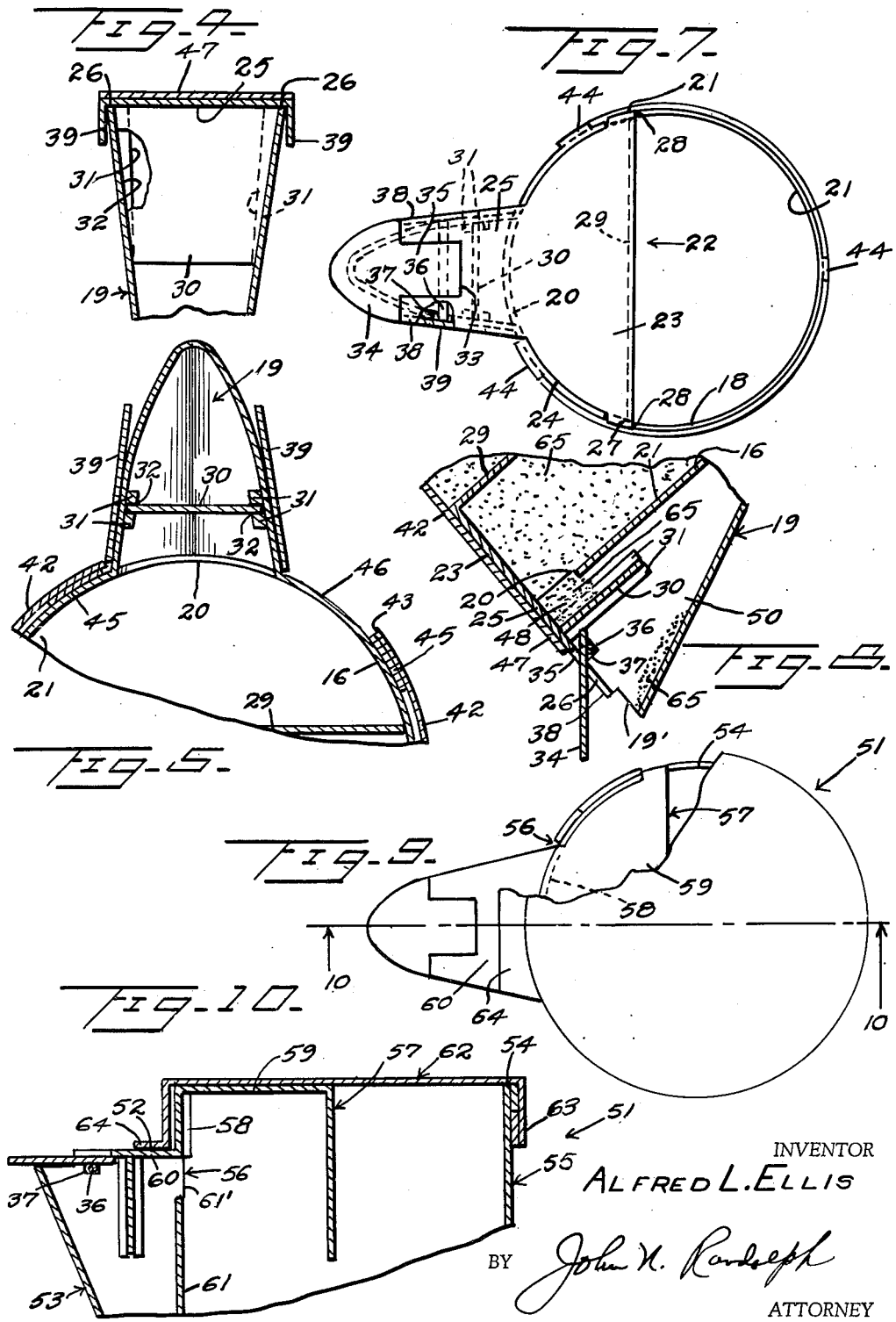

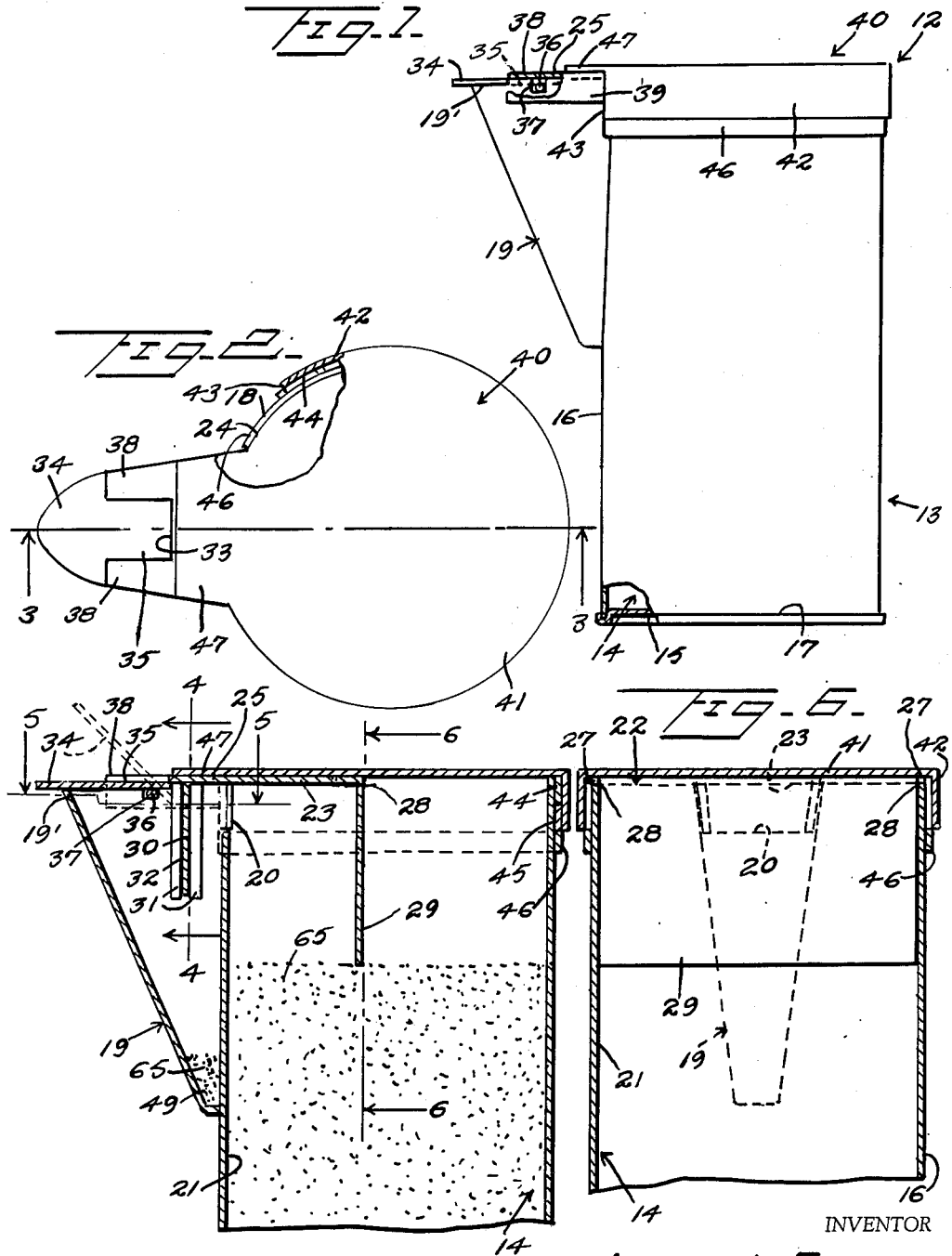

United States Patent Office 3,258,177
Patented June 28, 1966

3,258,177
MEASURING AND DISPENSING DEVICE FOR GRANULAR MATERIAL
Alfred L. Ellis, 71 Peachtree Place NE., Atlanta, Ga.
Filed Aug. 31, 1965, Ser. No. 484,024
6 Claims. (Cl. 222—455)

This invention relates to a novel container for holding, measuring and dispensing dry fluent materials, such as granular materials, and certain powdered materials, and which includes means for discharging a predetermined quantity of the contents of the container into the container spout, each time that the container is inverted and while a previously measured corresponding quantity is being dispensed from the spout.

More particularly, it is an object of the invention to provide an attachment of a simple construction which may be removably attached to a container to function with certain features of the container to effect the dispensing of measured quantities of the contents of the container.

Another object of the invention is to provide a measuring and dispensing container having certain removable parts to enable the container to be readily maintained in a clean and sanitary condition.

A further object of the invention is to provide a measuring and dispensing means for a container of extreme simple construction, thereby enabling the container, equipped with such means, to be very economically manufactured and sold.

Still another object of the invention is to provide a container of the aforedescribed character having only one part which is movable in connection with the operation and use of the container.

Various other objects and advantages of the invention will hereinafter become more fully apparent from the following description of the drawings, illustrating presently preferred embodiments thereof, and wherein:

FIGURE 1 is a side elevational view, partly broken away, showing a container equipped with the measuring and dispensing unit;

FIGURE 2 is an enlarged top plan view thereof, partly broken away;

FIGURE 3 is a fragmentary vertical sectional view, taken substantially along a plane as indicated by the line 3—3 of FIGURE 2;

FIGURE 4 is a transverse vertical sectional view through a portion of the spout, taken substantially along a plane as indicated by the line 4—4 of FIGURE 3, and on an enlarged scale;

FIGURE 5 is an enlarged fragmentary horizontal sectional view taken substantially along a plane as indicated by the line 5—5 of FIGURE 3;

FIGURE 6 is a fragmentary vertical sectional view taken substantially along a plane as indicated by the line 6—6 of FIGURE 3;

FIGURE 7 is a top plan view of the measuring and dispensing container with the cover removed;

FIGURE 8 is a fragmentary sectional view taken substantially along a plane corresponding to the plane of FIGURE 3 but showing the container inverted;

FIGURE 9 is a top plan view, similar to FIGURE 2, but illustrating a slightly modified form of the measuring and dispensing container, and FIGURE 10 is a fragmentary vertical sectional view thereof, taken substantially along a plane as indicated by the line 10—10 of FIGURE 9.

Referring more specifically to the drawings, and first with reference to FIGURES 1 to 8, the measuring and dispensing device in its entirety, as illustrated therein, is designated generally 12 and includes a container 13. The container 13 has a body portion 14 including a bottom 15 and a surrounding side wall 16, which rises from the bottom 15, and which is shown as being cylindrical in cross section. The bottom 15 includes a bead 17 which surrounds the lower end of the wall 16. The wall 16 has a rim 18 at its upper end constituting the open top of the body 14. The container 13 also includes a spout 19 which constitutes an integral part of the wall 16 and which is disposed on the outside of a part thereof. A part of the rim 18 is recessed, as seen at 20 in FIGURES 3 and 5, to form a communicating passageway between the upper part of the chamber 21, formed by the body 14, and an upper inner part of the spout 19. The measuring and dispensing device 12 also includes a removable unit designated generally 22, which is detachably associated with the container 13 and which includes a top wall portion 23 which covers somewhat less than one-half of the open top of the chamber 21, specifically that part located adjacent to the spout 19, and which top wall portion 23 has an arcuate edge 24 which fits snugly within a part of the rim 18. The top wall portion 23 has an extension 25 projecting from the intermediate portion of the arcuate edge 24 and which overlies and rests upon the inner part of the rim 26 of the spout 19, as seen in FIGURE 4. The top portion 23 at the ends of its arcuate edge 24 has lugs or extensions 27 which rest in notches or recesses 28 of the rim 18.

The removable unit 22 includes a wall 29 which extends downwardly from the inner straight edge of the top portion 23, as seen in FIGURE 3, and which extends across the chamber 21, as seen in FIGURE 6. The wall 29 extends to substantially below the passage 20, preferably less than half the depth of the container 13. The unit 22 includes a second depending wall 30 which extends downwardly from a part of the extension 25 into the upper portion of the spout 19 and which is disposed parallel to the wall 29. Each side of the spout 19 has a pair of vertically disposed ribs 31 on its inner side forming a groove or channel 32. The grooves or channels 32 are disposed in transverse alignment with one another, as seen in FIGURE 5, to receive the side edges of the wall 30 which fit slidably but snugly therein. The wall 30 extends to below the bottom edge of the passage 20 but terminates substantially above the lower end of the spout 19, as seen in FIGURE 3. The ribs 31 taper in thickness from their upper to their lower ends, as seen in FIGURE 4.

The extension 25, beyond the wall 30, has a recess or notch 33 which opens outwardly at its extremity to receive a reduced inner end 35 of a spout cover 34. A shaft 36 extends across and is secured to an underside of the part 35, and has end portions projecting from the side edges of the part 35 and forming trunnions which are journaled in upwardly opening notches 37 of the edges 26, beyond the ribs 31. The recess or notch 33 forms furcations 38 which straddle the portion 35 and bear upon the edges 26, for retaining the ends of the shaft 36 in the journals 37. The projection 25 has depending flanges 39 at its side edges which straddle the upper portion of the sides of the spout 19 and the ends of the shaft 36, to prevent any endwise movement of said shaft in the journals 37 and lateral movement of the spout cover 34. The outer portion of the upper edge of the spout 19 forms a lip 19' on which the outer portion of the cover 34 normally rests, as seen in FIGURES 1 and 3, and which is downwardly offset relative to the edge portions 26.

The container 13 is provided with a cover 40 including a substantially flat top 41 and a depending flange 42. A part of the flange 42 is cut away, as seen at 43, to accommodate the spout 19. The exterior of the wall 16, adjacent the rim 18, is provided on the outer side thereof with circumferentially spaced lugs 44 (FIGURES 2, 3 and 7), and the interior of the flange 42 is provided adjacent to its bottom edge with lugs 45 which are spaced apart the same distance as the lugs 44. The cover 40 is applied with the lugs 45 out of alignment with the lugs 44, after which the cover 40 is twisted slightly to engage the lugs 45 under the lugs 44 to lock the cover 40 on the container body 14 by a bayonet-type form of joint. As seen in FIGURE 2, the recess 43 is made longer than the width of the spout 19 to accommodate this twisting movement of the cover after it has been applied; the cover 40 being turned clockwise, after application, to its locked position of FIGURE 2. A bead 46 is formed around the exterior of the wall 16 near its upper end to the sides of the spout 19, and is disposed so that the lugs 45 bear thereon, as seen in FIGURE 3. The top wall 41 has an extension 47 which rests on the projection 25 to hold said projection in tight engagement with the edges 26 when the cover 40 is applied.

Assuming that the measuring and dispensing device 12 is assembled as heretofore described and illustrated in FIGURES 1 to 8 with the cover 40 applied and with the chamber 21 at least partially filled with a dry fluent material 65 (FIGURES 3 and 8), the device 12 is initially inverted from its position of FIGURE 3 to its position of FIGURE 8. When this occurs, a part of the material 65 in the chamber 21 will flow through the passage 20 to fill the space in the spout 19 between the wall 30 and said passage 20 which constitutes a measuring pocket 48 (FIGURE 8). When the device 12 is thereafter returned to its upright position of FIGURE 3, the material 65 will move by gravity from the measuring pocket 48 to the lower part of the spout 19 which constitutes a holding pocket 49 (FIGURE 3). The next time, and each time thereafter, that the aforedescribed operation is repeated, as the device 12 is moved to its substantially inverted position of FIGURE 8 the measured quantity of material in the holding pocket 49 will move by gravity through the discharge passage 50 (FIGURE 8) and will be discharged from the spout 19 through the lip 19'. While this is occurring the measuring pocket 48 is being refilled. As the container 13 approaches its substantially inverted position of FIGURE 8, the spout cover 34 is gravity urged to its open position to permit discharge of material from the spout 19, and said cover 34 will resume its closed position when the container 13 is returned to its upright position of FIGURES 1 and 3. The interior wall or partition 29 functions as a retarding means for holding back a considerable amount of the material in the chamber 21 (FIGURE 8), when said chamber is more than half full, so that the material will not exert too much pressure at the passage 20, which could result in the material being packed too tightly in the measuring pocket 48, or cause overloading or overflow into the discharge area 50.

The capacity of the measuring pocket 48 can be varied to vary the amount of material measured and dispensed each time that the device 12 is inverted, after the initial inverting thereof. This can be accomplished by varying the spacing between the passage 20 and the wall 30, by varying the depth and width of the passage 20 or the width of the spout 19. The extension 47 provides an additional support for a part of the extension 25 which constitutes the bottom of the measuring pocket 48 when the device 12 is substantially inverted as seen in FIGURE 8.

FIGURES 9 and 10 illustrate a slightly modified embodiment of the measuring and dispensing device, designated generally 51, and wherein the upper edge 52 of the spout 53 is downwardly offset relative to the upper edge or rim 54 of the container body 55. The recess 56 of the wall of the container 55, and which replaces the recess or passage 20, is made deeper than said passage 20. The removable unit 57 differs from the unit 22, which it replaces, in that the unit 57 has a vertical wall 58 depending from its top wall 59 and connecting said wall 59 to a projection 60 which rests on the edges 52 of the spout 53. The wall 58 is arcuately bowed from end-to-end thereof to conform to the curvature of a cylindrical wall 61 of the body 55 and fits in and closes the upper portion of the recess 56. The lower portion of the recess 56, which is disposed below the wall 58, opens into the upper part of the spout 53 and forms a passage 61' connecting the interior of the body 55 to the spout 53, and which corresponds with the passage 20.

The cover 62 of the body 55 differs from the cover 40 in that the depending flange 63 is continuous; and the extension 64 of the cover 62, which rests on the extension 60 and performs the same function as the extension 47 of the cover 40, extends from a portion of the bottom edge of the flange 63.

The measuring and dispensing device 51 otherwise corresponds with the measuring and dispensing device 12 and operates in the same manner as said device 12, so that a further description of the construction and operation thereof is considered unnecessary.

It will be readily apparent that the removable units 22 and 57 of the devices 12 and 51, respectively, may be readily removed after the removal of the covers 40 and 62, and that the spout covers may then be readily removed so that all of these parts and the containers or receptacles may be readily and efficiently cleaned and thus maintained in a sanitary condition. It will also be apparent that in use, when fully assembled, the spout cover constitutes the only movable part of either the device 12 or the device 51.

Various other modifications and changes are contemplated and may be resorted to without departing from the function or scope of the invention as hereinafter defined by the appended claims.

I claim as my invention:

1. A measuring and dispensing device for dry fluent material comprising a container having an open top and a spout disposed on the exterior thereof, said container being recessed at its open top to provide a passage between the interior of said container and the interior of the spout, a unit detachably mounted on said container including a top wall partially closing the top of said container and having an extension partially covering the open top of said spout, a wall forming a part of said unit and extending downwardly into the spout and terminating nearer the top of the spout than the spout bottom but substantially below said passage, said wall separating an inner portion of the spout from an outer portion thereof and being spaced from and combining with said passage and a part of said extension to form a measuring pocket in the upper inner part of the spout adapted to be filled with a predetermined quantity of a fluent material contained in said container when the container is substantially inverted, the bottom of said spout forming a holding pocket adapted to receive the measured quantity of the material from the measuring pocket when the container is returned to an upright position, and the upper and outer portion of said spout forming a discharge passage through which the material from the holding pocket is discharged by gravity from the spout when the container is again inverted for refilling said measuring pocket.

2. A measuring and dispensing device as in claim 1, a cover for closing the top of the discharge passage of said spout, said spout having aligned journals, a pivot carried by the cover and detachably engaged in said journals, and said extension having means confining the pivot element in said journals for retaining the spout cover applied to the spout when said detachable unit is applied to said container and spout.

3. A measuring and dispensing device as in claim 1, said spout having pairs of internal ribs forming opposed grooves in which side edges of said wall slidably fit.

4. A measuring and dispensing device as in claim 1, a removable cover closing the open top of the container, means detachably interlocking said cover to the container, said cover having a depending flange provided with a recess for accommodating the upper portion of the spout.

5. A measuring and dispensing device for dry fluent material comprising a container having an open top and a spout disposed on the exterior thereof, said container being recessed at its open top to provide a passage between the interior of said container and the interior of the spout, a unit detachably mounted on said container including a top wall partially closing the top of said container and having an extension partially covering the open top of said spout, a wall forming a part of said unit and extending downwardly into the spout and terminating above the spout bottom, said wall separating an inner portion of the spout from an outer portion thereof and being spaced from and combining with said passage and a part of said extension to form a measuring pocket in the upper inner part of the spout adapted to be filled with a predetermined quantity of a fluent material contained in said container when the container is substantially inverted, the bottom of said spout forming a holding pocket adapted to receive the measured quantity of the material from the measuring pocket when the container is returned to an upright position, and the upper and outer portion of said spout forming a discharge passage through which the material from the holding pocket is discharged by gravity from the spout when the container is again inverted for refilling said measuring pocket, said unit including a retarding wall extending downwardly into the container from said top wall and terminating below said passage and above the container bottom for holding a part of the material in the container away from said passage when the container, more than partially filled, is inverted.

6. A measuring and dispensing device for dry fluent material comprising a container having an open top and a spout disposed on the exterior thereof, said container being recessed at its open top to provide a passage between the interior of said container and the interior of the spout, a unit detachably mounted on said container including a top wall partially closing the top of said container and having an extension partially covering the open top of said spout, a wall forming a part of said unit and extending downwardly into the spout and terminating above the spout bottom, said wall separating an inner portion of the spout from an outer portion thereof and being spaced from and combining with said passage and a part of said extension to form a measuring pocket in the upper inner part of the spout adapted to be filled with a predetermined quantity of a fluent material contained in said container when the container is substantially inverted, the bottom of said spout forming a holding pocket adapted to receive the measured quantity of the material from the measuring pocket when the container is returned to an upright position, and the upper and outer portion of said spout forming a discharge passage through which the material from the holding pocket is discharged by gravity from the spout when the container is again inverted for refilling said measuring pocket, a cover for closing the open top of said container, means detachably interlocking the cover on the container, said cover having a continuous depending flange overlying an upper portion of the container, the upper part of said spout being downwardly offset relative to the open top of the container and being disposed beneath the cover flange, said top wall of the detachable unit having a depending wall portion occupying the upper part of the passage and from which said extension projects for offsetting said extension downwardly from the top wall.

References Cited by the Examiner
UNITED STATES PATENTS

| | | | |
|---|---|---|---|
| 1,066,384 | 7/1913 | Desmarais | 222—455 X |
| 2,739,741 | 3/1956 | Barnett | 222—455 |
| 3,022,924 | 2/1962 | Wistrand | 222—456 |
| 3,055,561 | 9/1962 | Luckett et al. | 222—455 |

ROBERT B. REEVES, *Primary Examiner.*

HADD S. LANE, *Examiner.*